(12) United States Patent
Leibrandt et al.

(10) Patent No.: US 9,914,493 B2
(45) Date of Patent: Mar. 13, 2018

(54) MOTOR VEHICLE HAVING A WHEEL ARCH

(71) Applicant: Dr. Ing. h.c. F. Porsche Aktiengesellschaft, Stuttgart (DE)

(72) Inventors: Kai Leibrandt, Stuttgart (DE); Emiel Burki, Stuttgart (DE); Jan Koerner, Leonberg (DE); Gabor Herczeg, Leimen (DE); Michael Behr, Waakirchen (DE); Mitja Borkert, Rutesheim (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/226,224

(22) Filed: Aug. 2, 2016

(65) Prior Publication Data
US 2017/0036708 A1 Feb. 9, 2017

(30) Foreign Application Priority Data
Aug. 7, 2015 (DE) ......................... 10 2015 113 011

(51) Int. Cl.
*B62D 37/02* (2006.01)
*B62D 35/00* (2006.01)

(52) U.S. Cl.
CPC ............. *B62D 35/00* (2013.01); *B62D 37/02* (2013.01)

(58) Field of Classification Search
CPC ................................ B62D 35/00; B62D 37/02
See application file for complete search history.

(56) References Cited

U.S. PATENT DOCUMENTS

| 6,712,425 | B2 * | 3/2004 | Brulhart | B62D 25/18 |
| | | | | 296/180.1 |
| 2010/0156142 | A1 * | 6/2010 | Sumitani | B62D 25/161 |
| | | | | 296/180.1 |
| 2012/0061993 | A1 | 3/2012 | Hasegawa et al. | |

FOREIGN PATENT DOCUMENTS

| DE | 10 2010 050 988 | 6/2011 |
| DE | 10 2010 037 616 | 3/2012 |
| FR | 2 858 796 | 2/2005 |
| JP | 2011-201543 | 10/2011 |
| JP | 10 2011 053 350 | 3/2012 |
| JP | 2013-203096 | 10/2013 |

\* cited by examiner

*Primary Examiner* — Lori L Lyjak
(74) *Attorney, Agent, or Firm* — Gerald E. Hespos; Michael J. Porco; Matthew T. Hespos

(57) ABSTRACT

A motor vehicle (1) has a wheel arch (3), in which a wheel (4) is arranged, and has an air guiding apparatus (20) for guiding an air flow (8) that flows onto the wheel arch (3) during operation of the motor vehicle. The air guiding apparatus (20) is configured and arranged in such a way that a first part air flow (11) is guided past an inner side of the wheel (4) and a second part air flow (12) is guided past an outer side of the wheel (4). The two part air flows (11, 12) then are combined again behind the wheel arch (3) in a vehicle longitudinal direction.

9 Claims, 1 Drawing Sheet

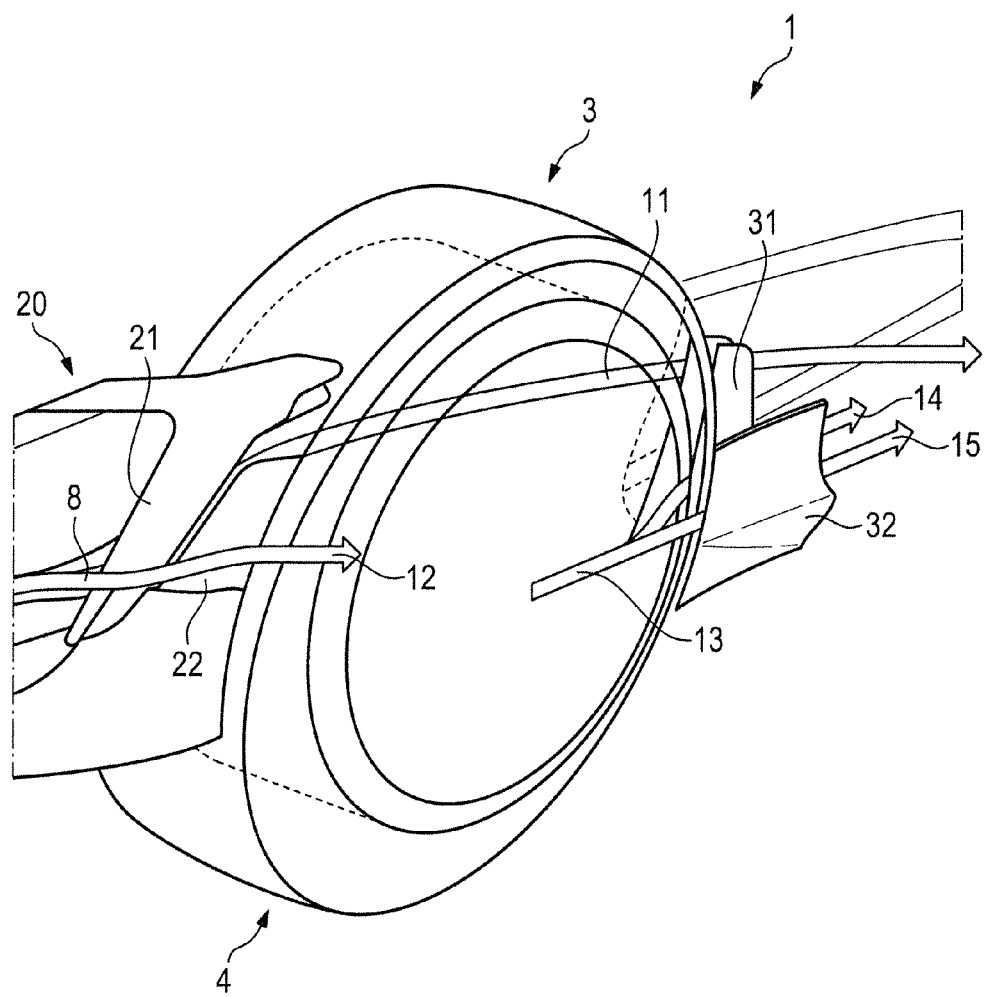

MOTOR VEHICLE HAVING A WHEEL ARCH

CROSS REFERENCE TO RELATED APPLICATION

This application claims priority under 35 USC 119 to German Patent Appl. No. 10 2015 113 011.4 filed on Aug. 7, 2015, the entire disclosure of which is incorporated herein by reference.

BACKGROUND

1. Field of the Invention

The invention relates to a motor vehicle having a wheel arch, in which a wheel is arranged, and having an air guiding apparatus for an air that flows onto the wheel arch during operation of the motor vehicle.

2. Description of the Related Art

JP 2011-201543 discloses an air guiding apparatus arranged on the underbody paneling in front of the wheel arch of a motor vehicle. The air guiding apparatus divides the air flow in front of the vehicle wheel. JP 2013-203096 discloses a triangular air guiding apparatus arranged in front of the wheel arch in the front part of a motor vehicle. FR 2 858 796 discloses an air inlet on the front part of a motor vehicle. The air inlet guides the air via air guiding elements both under the vehicle and laterally past the vehicle. DE 10 2010 050 988 A1 discloses openings on a wheel arch of a motor vehicle. The openings allow inflow of air both in a longitudinal direction and in a transverse direction. DE 10 2011 053 350 A1 discloses an air flow deflecting device that protrudes down from a vehicle body in front of a wheel arch. DE 10 2010 037 616 A1 discloses air guiding elements on the underbody of the vehicle. The air guiding elements are set vertically with respect to the roadway and are at an oblique angle to the longitudinal center axis of the vehicle.

It is an object of the invention to improve the driving behavior of a motor vehicle having a wheel arch and having an air guiding apparatus for an air flow that flows onto the wheel arch during operation of the motor vehicle.

SUMMARY

A motor vehicle has a wheel arch in which a wheel is arranged and has an air guiding apparatus for an air that flows onto the wheel arch during operation of the motor vehicle. The air guiding apparatus is configured and arranged so that a first part air flow is guided past an inner side of the wheel and a second part air flow is guided past an outer side of the wheel. The two part air flows is combined again behind the wheel arch in a vehicle longitudinal direction. The air resistance of the motor vehicle can be reduced advantageously by the division of the flow path into two part air flows and the combination of the two part air flows behind the wheel arch.

The air guiding apparatus may comprise at least one front air guiding device, by way of which the air that flows onto the wheel arch during operation of the motor vehicle is divided into the two part air flows. The terms "front" and "rear" relate to a vehicle longitudinal direction which is also called the x-direction.

The air guiding apparatus may comprise a first front air guiding device for guiding the first part air flow past the inner side of the wheel. The first front air guiding device is configured and disposed to guide the first part air flow into the wheel arch in such a way that the first part air flow flows past the wheel on the inside.

The air guiding apparatus may further comprise a second front air guiding device for guiding the second part air flow past the outer side of the wheel. The second part air flow advantageously is guided past the wheel on the outside substantially parallel to the first part air flow.

The air guiding apparatus may comprise at least one rear air guiding device, by way of which the two part air flows are combined behind the wheel arch in the vehicle longitudinal direction. The second part air flow initially guided out of the wheel arch and is then combined with the first part air flow.

The air guiding apparatus may comprise a first rear air guiding device that guides the first part air flow behind the wheel arch toward the second part air flow. The first part air flow that exits from the wheel arch is guided in the direction of the second part air flow by way of the first rear air guiding device.

The air guiding apparatus may further comprise at least one second rear air guiding device that guides the second part air flow behind the wheel arch toward the first part air flow. The air guiding devices may be air guiding elements or air guiding plates.

The motor vehicle may comprise two front wheel arches. Each front wheel arch may have an air guiding apparatus that is configured and arranged so that a first part air flow is guided past an inner side of the wheel and a second part air flow is guided past an outer side of the wheel. The two part air flows is combined again behind the respective wheel arch in a vehicle longitudinal direction. The air flows may flow onto the two front wheel arches via a corresponding front part of the motor vehicle.

The invention also relates to a method for operating a motor vehicle so that a first part air flow is guided past an inner side of the wheel and a second part air flow is guided past an outer side of the wheel. The two part air flows are combined again behind the wheel arch in the vehicle longitudinal direction. The division of the flow path of the air flow reduces the air resistance.

The invention relates to an air guiding apparatus or device, and/or a wheel arch for the above-described motor vehicle. These parts can be treated separately.

Further advantages, features and details of the invention result from the following description, in which one exemplary embodiment is described in detail with reference to the drawing.

BRIEF DESCRIPTION OF THE DRAWING

FIG. 1 is a perspective view of a wheel arch of a motor vehicle.

DETAILED DESCRIPTION

FIG. 1 shows a front wheel arch 3 of a motor vehicle 1, and a front wheel 4 is arranged in the wheel arch 3. During operation of the motor vehicle 1, an air flow 8 flows from the front onto the wheel arch 3. The air flow 8 is divided into a first part air flow 11 and a second part air flow 12 with the aid of an air guiding apparatus 20.

The first part air flow 11 is guided past an inner side of the wheel 4, and the second part air flow 12 is guided past an outer side of the wheel 4. An arrow 13 indicates that the second part air flow 12 is combined again with the first part air flow 11 behind the wheel arch 3.

Arrows 14 and 15 indicate that the second part air flows 12 and 13 can also be divided further. The part air flows 11 and 12 and 13, 14 and 15 are combined again behind the wheel arch 3.

The air guiding apparatus 20 comprises a first front air guiding device 21 and a second front air guiding device 22.

The first front air guiding device 21 divides a first part air flow 11 from the air flow 8 and guides the first part air flow 11 into the wheel arch 3 in such a way that the first part air flow 11 flows past the inner side of the wheel 4.

The second front air guiding device 22 divides a second part air flow 12 from the air flow 8 and guides the second part air flow 12 past the outer side of the wheel 4.

The air guiding apparatus 20 further comprises a first rear air guiding device 31 and a second rear air guiding device 32.

The first rear air guiding device 31 guides the first part air flow 11 out of the wheel arch 3 and in the direction of the first part air flow 12, 13, 14, 15.

The second rear air guiding device 32 guides the second part air flow 12 in the direction of the first part air flow 11, as indicated by the arrows 13, 14, 15.

The English term "air curtain" in the FIGURE below the arrow 12 means "Luftvorhang" in German. During operation of the motor vehicle, the wheel 4 is arranged between a first air curtain that is formed by the first part air flow 11 and a second air curtain that is formed by the second part air flow 12. The wheel 4 is arranged in a sandwich-like manner between two air curtains as a result of the two part air flows 11 and 12.

What is claimed is:

1. A motor vehicle comprising at least one wheel arch in which a wheel is arranged, and at least one air guiding apparatus for an air flow that flows onto the wheel arch during operation of the motor vehicle, the air guiding apparatus being configured and disposed to guide a first part air flow past an inner side of the wheel, to guide a second part air flow past an outer side of the wheel, and to combine the first and second part air flows behind the wheel arch in a vehicle longitudinal direction.

2. The motor vehicle of claim 1, wherein the air guiding apparatus comprises at least one front air guiding device that is configured to guide the air flow that flows onto the wheel arch during operation of the motor vehicle into the first and second part air flows.

3. The motor vehicle of claim 2, wherein the at least one front air guiding device comprises a first front air guiding device that guides the first part air flow past the inner side of the wheel.

4. The motor vehicle of claim 3, wherein the at least one front air guiding device comprises a second front air guiding device that guides the second part air flow past the outer side of the wheel.

5. The motor vehicle of claim 2, wherein the air guiding apparatus further comprises at least one rear air guiding device configured to combine the first and second part air flows behind the wheel arch in the vehicle longitudinal direction.

6. The motor vehicle of claim 5, wherein the at least one rear air guiding device comprises a first rear air device configured to guide the first part air flow behind the wheel arch toward the second part air flow.

7. The motor vehicle of claim 6, wherein the at least one rear air guiding device further comprises at least one second rear air guiding device configured to guide the second part air flow behind the wheel arch toward the first part air flow.

8. The motor vehicle of claim 1, wherein the at least one front wheel arch comprises two front wheel arches and the at least one air guiding apparatus comprises two air guiding apparatuses assigned respectively to the two front wheel arches.

9. A method for operating a motor vehicle, comprising: guiding a first part air flow past an inner side of a wheel; guiding a second part air flow past an outer side of the wheel; and combining the first and second part air flows behind the respective wheel in a vehicle longitudinal direction.

* * * * *